(12) United States Patent
Park et al.

(10) Patent No.: US 9,014,086 B2
(45) Date of Patent: Apr. 21, 2015

(54) APPARATUS AND METHOD FOR ALLOCATING RESOURCES IN A BROADBAND WIRELESS COMMUNICATION SYSTEM

(75) Inventors: Jun-Seong Park, Seongnam-si (KR); Jae-Hyun Ahn, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 221 days.

(21) Appl. No.: 13/318,295

(22) PCT Filed: May 11, 2010

(86) PCT No.: PCT/KR2010/002983
§ 371 (c)(1), (2), (4) Date: Oct. 31, 2011

(87) PCT Pub. No.: WO2010/134715
PCT Pub. Date: Nov. 25, 2010

(65) Prior Publication Data
US 2012/0093111 A1    Apr. 19, 2012

(30) Foreign Application Priority Data
May 21, 2009    (KR) .................. 10-2009-0044387

(51) Int. Cl.
*H04W 4/00* (2009.01)
*H04W 16/02* (2009.01)
*H04W 4/12* (2009.01)
*H04W 48/08* (2009.01)

(52) U.S. Cl.
CPC ............... *H04W 16/02* (2013.01); *H04W 4/12* (2013.01); *H04W 48/08* (2013.01)

(58) Field of Classification Search
None
See application file for complete search history.

(56) References Cited

U.S. PATENT DOCUMENTS

| 8,121,143 | B2 * | 2/2012 | Jung ............................ 370/444 |
| 2005/0288027 | A1 * | 12/2005 | Cho et al. ...................... 455/442 |
| 2006/0153112 | A1 * | 7/2006 | Lim et al. ...................... 370/310 |
| 2007/0223419 | A1 * | 9/2007 | Ji et al. ......................... 370/329 |
| 2008/0186885 | A1 * | 8/2008 | Athalye et al. ................ 370/310 |
| 2008/0205364 | A1 * | 8/2008 | Park et al. ..................... 370/338 |

(Continued)

FOREIGN PATENT DOCUMENTS

| KR | 1020050107254 A | 11/2005 |
| KR | 1020070073337 A | 7/2007 |
| KR | 1020080090354 A | 10/2008 |

OTHER PUBLICATIONS

International Search Report for PCT/KR2010/002983 filed on May 11, 2010.

(Continued)

*Primary Examiner* — Brian Roberts (57) ABSTRACT

The present invention relates to an apparatus and method for allocating a MAP message region in a broadband wireless communication system having a multi-cell/-sector structure. The present invention allocates a common MAP message region for multiple cells/sectors and a data region, divides the common MAP message region into MAP message sections for each of the cells or each of the sectors, allocates MAP messages corresponding to each of the cells or each of the sectors to the divided MAP message sections and allocates data to be transmitted to each MS to the data region, and broadcasts multiple frames containing MAP message regions for each of the cells or for each of the sectors and the data region.

7 Claims, 5 Drawing Sheets

(56) References Cited

U.S. PATENT DOCUMENTS

| | | | |
|---|---|---|---|
| 2009/0073928 A1* | 3/2009 | Power et al. | 370/329 |
| 2009/0285178 A1* | 11/2009 | Chin et al. | 370/331 |
| 2010/0172307 A1* | 7/2010 | Niki | 370/329 |

OTHER PUBLICATIONS

Written Opinion for PCT/KR2010/002983 filed on May 11, 2010.

\* cited by examiner

APPARATUS AND METHOD FOR ALLOCATING RESOURCES IN A BROADBAND WIRELESS COMMUNICATION SYSTEM

TECHNICAL FIELD

The present invention relates generally to a broadband wireless communication system, and more particularly to an apparatus and method for allocating a MAP message region in a broadband wireless communication system having a multiple cell/sector structure.

BACKGROUND ART

An IEEE (Institute of Electrical and Electronics Engineers) 802.16 communication system that employs OFDM (Orthogonal Frequency Division Multiplexing)/OFDMA (Orthogonal Frequency Division Multiple Access) is proposed as a BWA (Broadband Wireless Access) system, in order to support broadband transmission network for physical channels of the wireless communication system. The IEEE 802.16 communication system is a system that considers not only fixed state but also mobile state of subscriber station, wherein the subscriber station having mobility can be referred to as a mobile station (hereinafter, referred to as 'MS'). Also, a portable internet system or WiMAX (Worldwide Interoperability for Microwave Access) that is a kind of the BWA system is proposed, in order to provide various services such as broadcasting, multimedia video, multimedia message, etc.

Meanwhile, the broadband wireless communication system allocates resources to provide services to the MSs in multiple cells/sectors and provides services to the MSs through the allocated resources. In this case, the broadband wireless communication system allocates a MAP message region through which a MAP message is transmitted to all MSs in the multiple cells/sectors and a data region through which service data are transmitted to the MSs. The MAP message is a broadcasting message that is transmitted to all MSs in the multiple cells/sectors, and includes MAP information that is necessary for the MSs to receive data that are transmitted through the data region.

The MSs in the multiple cells/sectors receive the MAP message from a base station (hereinafter, referred to as 'BS') that manages the multiple cells/sectors, check MAP information included in the MAP message, and receive data that are transmitted from the BS through the data region, by using the MAP information. For reference, the MSs in the multiple cells/sectors should receive the MAP message in order to receive data. Generally, the BS performs a modulation and coding for the MAP message with most robust MCS (Modulation and Coding Scheme) level and broadcasts the MAP message to the MSs through the MAP message region, in order for all MSs to receive the MAP message.

Meanwhile, the MAP message is broadcasted to the MSs in the multiple cells/sectors through the common MAP message region. Herein, the common MAP message region denotes a MAP message region that is allocated to entire frequency band in each cell/sector frame of the multiple cells/sectors. In case that the MAP message is broadcasted through the common MAP message region of the multiple cells/sectors, the interference by the multiple cells/sectors may occur at the MAP message.

Particularly, in boundary regions with adjacent cells/sectors, the interference by the adjacent cells/sectors is more increased at the MAP message, and the MS can not normally receive the MAP message of serving cell/sector by the interference. Therefore, there is a demand for new scheme that can efficiently allocate the MAP message region so that the MS can normally receive the broadcasted MAP message in the multiple cells/sectors.

Meanwhile, generally, the most robust MCS level, e.g. QPSK (Quadrature Phase Shift Key) ½ with repetition 6, is applied in the MAP message region of the multiple cells/sectors through which the MAP message is transmitted, so that the MSs in the multiple cells/sectors can normally receive the MAP message. That is, the MAP message is modulated and coded with QPSK ½×6 and is broadcasted through the MAP message region. However, since the most robust MCS level is applied in the MAP message region of the multiple cells/sectors, the interference by the MAP message of the adjacent cells/sectors is more increased, and thus the MS can not normally receive the MAP message of serving cell/sector. Therefore, there is a demand for new scheme that can efficiently allocate the MAP message region so that the interference by the adjacent MAP message can be decreased in the multiple cells/sectors.

DISCLOSURE

Technical Problem

Therefore, the present invention has been made in view of the above-mentioned demands, and it is an object of the present invention to provide an apparatus and method for allocating a MAP message region in order to normally receive a broadcasted MAP message in multiple cells/sectors in a broadband wireless communication system.

It is another object of the present invention to provide an apparatus and method for allocating a MAP message region in order to minimize interference by the MAP message of the adjacent cells/sectors in a broadband wireless communication system.

Technical Solution

According to one aspect of the present invention, there is provided an apparatus for allocating resources in a broadband wireless communication system, the apparatus comprising: a region segmenting part for allocating a common MAP message region and a data region for multiple cells/sectors and segmenting the common MAP message region into sub-MAP message regions for each of the cells or each of the sectors; a message allocating part for allocating MAP message corresponding to each of the cells or each of the sectors to the sub-MAP message region; and a data allocating part for allocating data to be transmitted to each mobile station to the data region.

According to another aspect of the present invention, there is provided a method for allocating resources in a broadband wireless communication system, the method comprising: allocating a common MAP message region and a data region for multiple cells/sectors and segmenting the common MAP message region into MAP message regions for each of the cells or each of the sectors; allocating MAP message corresponding to each of the cells or each of the sectors to the segmented MAP message region, and allocating data to be transmitted to each mobile station to the data region; and broadcasting multiple frames including the data region and the MAP message region for each of the cells or each of the sectors.

Advantageous Effects

According to the present invention, by segmenting the common MAP message region of the multiple cells/sectors into MAP message regions for each cell/sector and allocating each of the MAP message regions to corresponding cell/sector, the MAP message can be broadcasted through the segmented MAP message region in each cell/sector and thus the interference in the MAP message by the multiple cells/sectors can be minimized.

Also, according to the present invention, since the interference in the MAP message by the multiple cells/sectors is minimized, all MSs in the multiple cells/sectors can normally receive the MAP message and coverage for providing service can be increased.

DESCRIPTION OF THE DRAWINGS

The above and other aspects, features and advantages of the present invention will become more apparent from the following detailed description when taken in conjunction with the accompanying drawings in which.

MODE FOR INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present proposes an apparatus and method for allocating resources in a broadband wireless communication system, e.g. the IEEE 802.16 communication system that is a kind of the BWA system. Also, the present invention proposes an apparatus and method for allocating resources so that the MSs in the multiple cells/sectors can stably receive communication services from the BS managing the multiple cells/sectors in a broadband wireless communication system having a multiple cell/sector structure. Meanwhile, in an embodiment according to the present invention, the BS allocates the MAP message region and the data region, wherein the MAP message region denotes a region through which the MAP message is broadcasted to the MSs in the multiple cells/sectors and the data region denotes a region through which service data are transmitted to the MSs.

Hereinafter, with reference to FIG. 1, a broadband wireless communication system having a multiple cell/sector structure according to an embodiment of the present invention will now be described.

Figure 1:
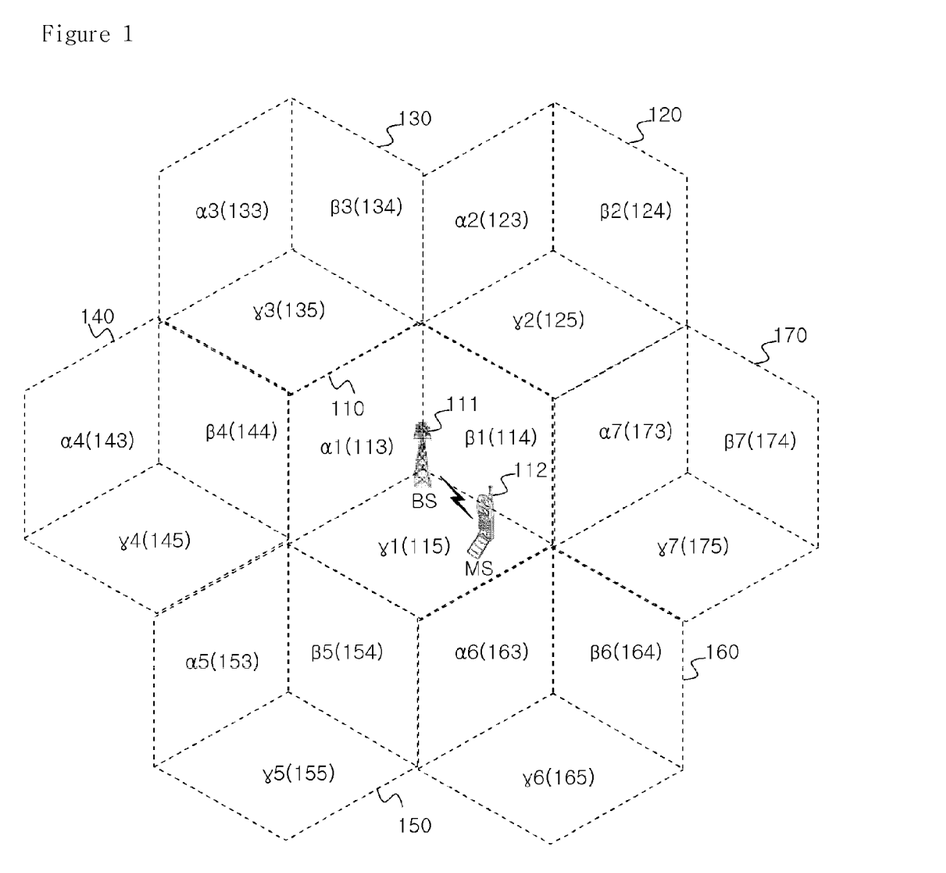
FIG. 1 is a diagram illustrating a structure of a broadband wireless communication system according to an embodiment of the present invention.

FIG. 1 is a diagram illustrating a structure of a broadband wireless communication system according to an embodiment of the present invention.

Referring to FIG. 1, the broadband wireless communication system includes BS 111 respectively taking charge of each cell/sector and MS 112 receiving communication service from BS 111 in each cell/sector, in multiple cell structure including a plurality of segmented cells 110, 120, 130, 140, 150, 160, 170 and multiple sector structure including a plurality of segmented sectors, wherein one cell includes three sectors (α (113, 123, 133, 143, 153, 163, 173), β (114, 124, 134, 144, 154, 164, 174), γ (115, 125, 135, 145, 155, 165, 175)). Herein, the MS 112 is static and/or mobile, and signal transmission/reception between the BS 111 and the MS 112 are performed based on OFDM/OFDAM scheme.

The BS 111 includes a scheduler that allocates the MAP message region and the data region. The scheduler receives Channel Quality Information (hereinafter, referred to as 'CQI') of the MS 112 and data information (e.g., data size, service type) of service for the MS 112, and allocates the MAP message region and the data region of the MS 112 by using the CQI and the data information.

Specifically, the scheduler allocates the MAP message region and allocates the data region by using the CQI and the data information, in order to transmit data to the MS 112. Also, the scheduler generates MAP information in accordance with the allocation of the data region. For reference, the MAP message including the MAP information is broadcasted to the MS 112 through the MAP message region, and data for the MS 112 are transmitted to the MS 112 through the data region. The scheduler will be described below with reference to FIG. 2.

The MAP message is a broadcasting message that is transmitted to all MSs in each cell/sector, and includes the MAP information that is necessary for the MSs to receive data that are transmitted through the data region. That is, the MAP message is the broadcasting message that the MSs in multiple cells/sectors should receive for data transmission/reception. The MAP information includes data region identification information, position and size information for a frame, information about MCS level and transmission power level that are applied to the data region, etc.

The scheduler segments the entire MAP message region for the multiple cells/sectors into MAP message regions for each of cells/sectors in a frame, and allocates the segmented MAP message region (i.e., sub-MAP message region) for each cell/sector as MAP message region for the corresponding cell/sector. The MAP message for each cell/sector is broadcasted through the MAP message region for the corresponding cell/sector. For reference, the entire MAP message region corresponding to the multiple cells/sectors in a frame is the common MAP message region, and the common MAP message region generally applies the most robust MCS level (e.g., QPSK ½×6). However, according to an embodiment of the present invention, by segmenting the entire MAP message region into MAP message regions for each cell/sector and broadcasting the MAP message through the segmented MAP region for each cell/sector, the interference in the MAP message by the multiple cells/sectors can be minimized and thus the MSs can stably receive the MAP message. Also, since the MSs can stably receive the MAP message, it is possible to apply a MCS level with lower repetition than that of the MCS level applied to the common MAP message region.

Specifically, the scheduler segments the common MAP message region of the multiple cells/sectors into MAP message regions for each cell/sector and allocates the segmented MAP message region for each cell/sector as MAP message region for the corresponding cell/sector. The common MAP message region denotes a MAP message region that is allocated to the entire frequency band in a frame of the multiple cells/sectors. The segmented MAP message region denotes a MAP message region that is allocated at different positions in a frame for each cell/sector, after segmenting the entire frequency band of the common MAP message region as predetermined sizes in accordance with each cell/sector. In this case, the segmented MAP message region for each cell/sector has different size each other in the frequency band according to a size of the MAP message of each cell/sector, and the MAP message of each cell/sector is broadcasted through the segmented MAP message region for each cell/sector. Since the MAP message of each cell/sector is broadcasted through the segmented MAP message region for each cell/sector, the interference in the MAP message by the multiple cells/sectors can be minimized, and thus the reception rate of the MAP message is increased. Consequently, the MSs can stably receive the MAP message, and the MCS level that has lower repetition than that of the MCS level applied to the common MAP message region can be applied in the MAP message region for each cell/sector. Therefore, a size in time domain of the common MAP message region can be the same as a size in time domain of the segmented MAP message region for each cell/sector.

For example, in case of the multiple sector structure of three sectors α, β, γ, the scheduler segments the common MAP message region of the three sectors into the MAP message region of the α sector, the MAP message region of the β sector, and the MAP message region of the γ sector. Then, the scheduler allocates the MAP message regions so that the MAP message is respectively broadcasted to the MSs in a sector through the MAP message region of the α sector, the MSs in β sector through the MAP message region of the β sector, and the MSs in γ sector through the MAP message region of the γ sector.

Since the MAP message is broadcasted through the MAP message regions of the α, β, γ sectors, the interference in the MAP message among the multiple cells/sectors can be minimized, and thus the reception rate of the MAP message is increased. Consequently, the MSs in each sector can stably receive the MAP message. Also, since the MSs in each sector can stably receive the MAP message, and the MCS level that has lower repetition than that of the MCS level applied to the common MAP message region can be applied in the MAP message region for each cell/sector. That is, the scheduler adjusts the repetition in the MCS level applied to the common MAP message region of the multiple cells/sectors, and applies the MCS level with the adjusted repetition to the segmented MAP message regions.

Meanwhile, if the MCS level applied to the common MAP message region of the multiple cells/sectors is simply applied to the segmented MAP message regions, the total size of the segmented MAP message regions is more increased than the size of the common MAP message region and thus the size of the data region for the MSs is decreased. However, according to the present invention, since the scheduler adjusts the repetition in the MCS level applied to the common MAP message region and applies the MCS level with the adjusted repetition to the segmented MAP message regions, the total size of the segmented MAP message regions can be the same as the size of the common MAP message region. That is, since the scheduler applies the MCS level with the adjusted repetition to the segmented MAP message regions, the size in time domain of the common MAP message region can be the same as the size in time domain of the segmented MAP message region for each cell/sector.

For example, if QPSK ½×6 is applied to the common MAP message region of the multiple cells/sectors, the scheduler adjusts the MCS level as QPSK ½×4 or QPSK ½×2 that has lower repetition than QPSK ½×6. In this case, preferably, the scheduler adjusts the MCS level as QPSK ½×2 since the common MAP message region is segmented into the MAP message regions of three sectors α, β, γ. If the scheduler applies QPSK ½×2 to the MAP message regions of three sectors α, β, γ, the MAP message is modulated and coded with QPSK ½×2 and is broadcasted to the MSs in the sectors α, β, γ through the MAP message regions.

In this manner, since the MAP message is broadcasted to the MSs in the multiple cells/sectors through the segmented MAP message regions, the interference in the MAP message by the multiple cells/sectors is minimized. Thereby, the MSs in the multiple cells/sectors successfully receive the MAP message and check the MAP information included in the MAP message. Also, the MSs in the multiple cells/sectors receive data that are transmitted through the data region, by using the MAP information, and thus are stably provided with service.

Hereinafter, with reference to FIG. 2, a scheduler in a broadband wireless communication system according to an embodiment of the present invention will now be described.

Figure 2:
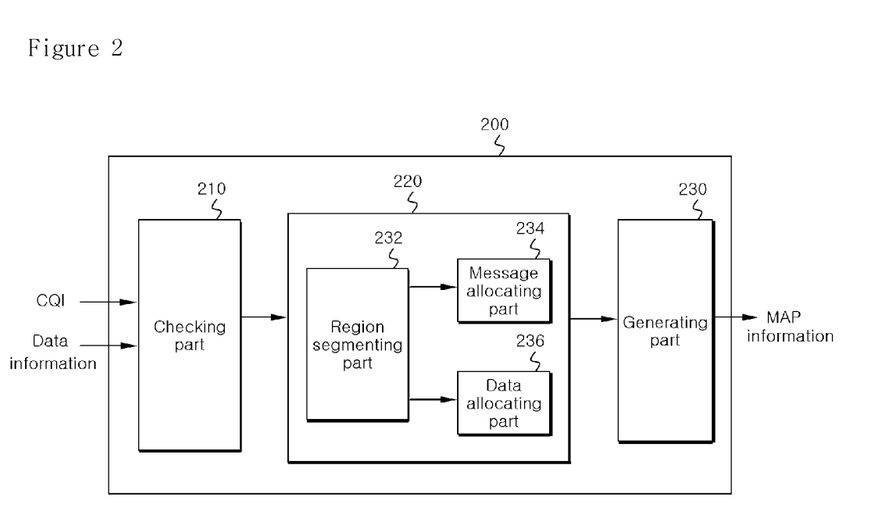
FIG. 2 is a diagram illustrating a structure of a scheduler in a broadband wireless communication system according to an embodiment of the present invention.

FIG. 2 is a diagram illustrating the structure of the scheduler in a broadband wireless communication system according to an embodiment of the present invention.

Referring to FIG. 2, the scheduler 200 according to the present invention includes a checking part 210 that checks the CQI and data information (e.g., data size, service type) of the MSs in the multiple cells/sectors, an allocating part 220 that allocates the MAP message region of the multiple cells/sectors and the data region of the MSs by using the CQI and data information checked by the checking part 210, and a generating part 230 that generates the MAP information corresponding to the data region allocation of the allocating part 220.

The checking part 210 checks data corresponding to service that should be provided to the MSs, by using the CQI and data information of the MSs, and transmits data check information to the allocating part 220 in order to allocate the data region for the checked data. Herein, the data check information includes data size, MCS level, transmission power level, etc.

The allocating part 220 allocates the MAP message region of the multiple cells/sectors, and allocates the data region for the MSs by using the data check information. In this case, the allocating part 220 allocates the data region for the MSs by using the data check information and determines the MCS level and transmission power level for data that are transmitted through the data region. That is, the allocating part 220 determines the position and size of the data region, and the MCS level and transmission power level applied to the data region.

In addition, the allocating part 220 allocates the MAP message region so that the MAP message including the MAP information corresponding to the allocation of the data region can be broadcasted to the MSs in the multiple cells/sectors. Also, the allocating part 220 determines the MCS level for the MAP message region. In this case, the allocating part 220 allocates the common MAP message region and the data region of the multiple cells/sectors, and includes a region segmenting part 232 that segments the common MAP message region into sub-MAP message regions which are separated for each of the cells/sectors, a message allocating part 234 that allocates the MAP message corresponding to each cell/sector to the sub-MAP message region, and a data allocating part 236 that allocates data to be transmitted to the MSs to the data region. For reference, the MAP message region allocation of the allocating part 220 will be described below with reference to FIG. 3.

The region segmenting part 232 allocates to the sub-MAP message regions the frequency band that is divided as many as the number of the MAP messages (i.e., sub-MAP messages) corresponding to each of cells/sectors in a FA (Frequency Assignment), and determines the sub-MAP message regions in different sizes according to sizes of the sub-MAP messages corresponding to each of cells/sectors. The message allocating part 234 allocates the MAP message corresponding to each cell/sector to the sub-MAP message region respectively, and determines the MCS level for the MAP message corresponding to each cell/sector respectively. The data allocating part 236 allocates data to be respectively transmitted to the corresponding MS to the data region.

The generating part 230 generates the MAP information in accordance with the data region allocation of the allocating part 220. Herein, the MAP information includes the data region identification information, the position and size information of the data region in a frame, the information about the MCS level and transmission power level that are applied to the data region, etc.

Hereinafter, with reference to FIG. 3, a MAP message region allocation in a broadband wireless communication system according to an embodiment of the present invention will now be described.

Figure 3:
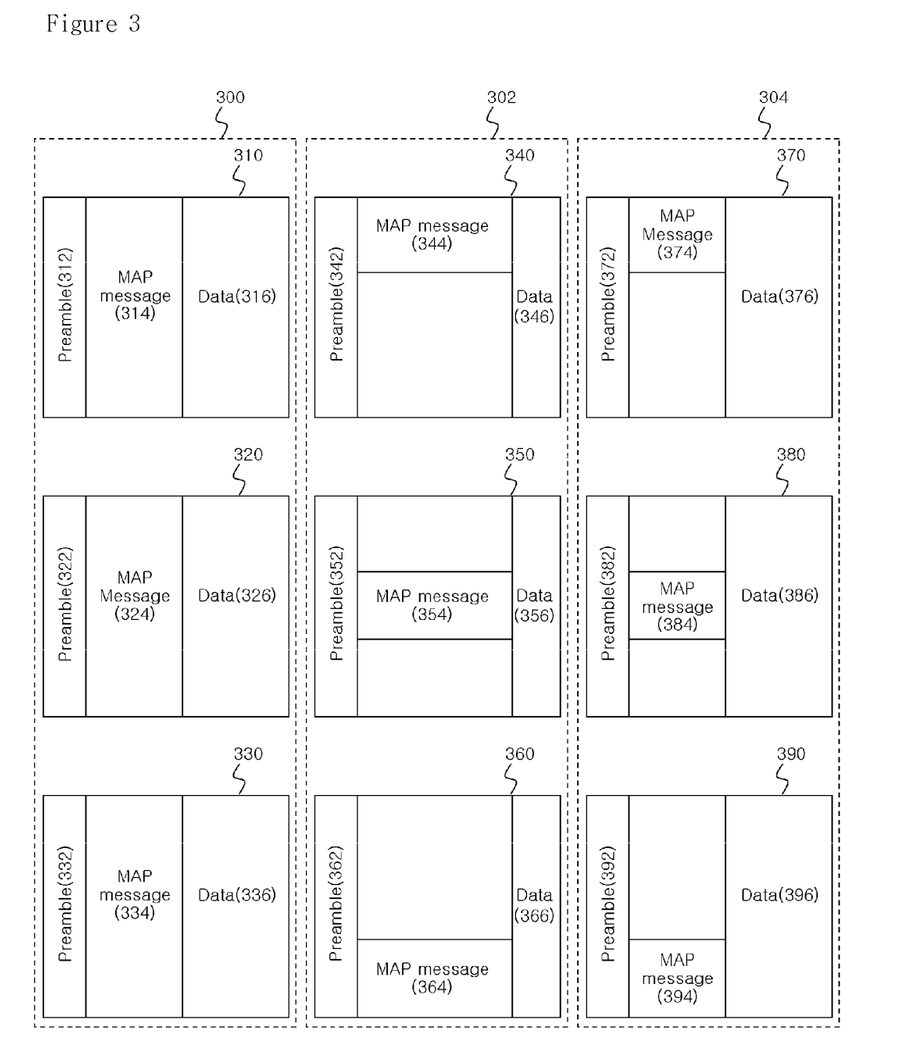
FIG. 3 is a diagram illustrating structures of frames for MAP message allocations of a scheduler in a broadband wireless communication system according to an embodiment of the present invention.

FIG. 3 is a diagram illustrating structures of frames for MAP message allocation of a scheduler in a broadband wireless communication system according to an embodiment of the present invention. For reference, FIG. 3 is a diagram illustrating multiple sector frames in a broadband wireless communication system having a multiple cell/sector structure. Although the MAP message allocation for the multiple sectors is illustrated in FIG. 3, the MAP message allocation for the multiple cells is also applied in the same way.

Referring to FIG. 3, in the multiple sector frame 300 in which the common MAP message region is allocated, the common MAP message regions 314, 324, 334 for each sector are allocated in the same position for α sector frame 310, β sector frame 320, and γ sector frame 330. Herein, the preamble regions 312, 322, 332 for synchronization between the BS and the MS, the common MAP message regions 314, 324, 334 and the data regions 316, 326, 336 are allocated in each sector frame 310, 320, 330. Also, 1FA (1 Frequency Assignment) is allocated for the common MAP message regions 314, 324, 334 in the multiple sectors and thus FRF (Frequency Reuse Factor) for the common MAP message regions 314, 324, 334 is 1.

However, in case that the MAP message is broadcasted to the MSs in the multiple sectors through the common MAP message regions 314, 324, 334 that are allocated in the same position of each sector frame 310, 320, 330, the interference in the MAP message owing to the multiple sectors occurs. Therefore, according to an embodiment of the present invention, the scheduler 200 divides the common MAP message region for the entire frequency band into the MAP message regions for each sector in order to minimize the interference. That is, the scheduler 200 segments the common MAP message region into the MAP message regions 344, 354, 364 for each sector and allocates the MAP message regions 344, 354, 364 to the α, β, γ sector frames 340, 350, 360. Herein, the entire frequency band is divided for the α, β, γ sectors. Then, in the frame 302 including the segmented MAP message regions 344, 354, 364 for each sector, the segmented MAP message regions 344, 354, 364 for each sector are allocated in different positions for α sector frame 340, β sector frame 350, and γ sector frame 360.

Herein, the preamble regions 342, 352, 362, the segmented MAP message regions 344, 354, 364 and the data regions 346, 356, 366 are allocated in each sector frame 340, 350, 360. Also, FA (Frequency Assignment) is divided into FA1-1, FA1-2, FA1-3 and allocated for the MAP message regions 344, 354, 364 in the multiple sectors and thus FRF (Frequency Reuse Factor) for the MAP message regions 344, 354, 364 is 3.

In this case, the scheduler 200 leaves the regions except the segmented MAP message regions 344, 354, 364 as empty regions in each sector frame 340, 350, 360. That is, the remained regions except the segmented MAP message regions 344, 354, 364 among regions corresponding to the common MAP message regions 314, 324, 334 in each sector frame 340, 350, 360 become the empty regions in order to minimize the interference of the MAP message by the multiple sectors.

Since the remained regions except the segmented MAP message regions 344, 354, 364 in each sector frame 340, 350, 360 become the empty regions, the interference in the MAP message owing to the multiple sectors is minimized and thus the reception rate of the MAP message is increased. Consequently, the MSs can stably receive the MAP message, and the repetition of the MCS level applied to the segmented MAP message regions 344, 354, 364 can be adjusted. Also, in case that the MCS level (e.g., QPSK ½×6) applied to the common MAP message region 314, 324, 334 is applied to the segmented MAP message regions 344, 354, 364, the total size of the segmented MAP message regions 344, 354, 364 and the empty regions is more increased than the size of the common MAP message region 314, 324, 334 and thus the size of the data regions 346, 356, 366 is decreased. That is, if the MAP message containing the MAP information with the same size is broadcasted, the size in time domain of the segmented MAP message regions 344, 354, 364 is larger than the size in time domain of the common MAP message region 314, 324, 334. To minimize the decrease of the size of the data regions 346, 356, 366, the scheduler 200 adjusts the repetition of the MCS level applied to the segmented MAP message regions 344, 354, 364.

For example, the scheduler adjusts the MCS level for the segmented MAP message regions 344, 354, 364 as QPSK ½×2 that has lower repetition than QPSK ½×6, and applies the adjusted MCS level to the α, β, γ sector frames 370, 380, 390. Herein, in the frame 304 including the segmented MAP message regions for each sector, the segmented MAP message regions 374, 384, 394 for each sector with QPSK ½×2 are finally allocated in different positions for α sector frame 370, β sector frame 380, and γ sector frame 390. The MAP message regions 374, 384, 394 with QPSK ½×2 that is finally allocated to each sector frame 370, 380, 390 have the same size corresponding to ⅓ size of the common MAP message region 314, 324, 334 or different sizes in accordance with the sizes of the MAP messages for each sector. Then, the size in time domain of the MAP message regions 374, 384, 394 with QPSK ½×2 MCS level is the same as the size in time domain of the common MAP message region 314, 324, 334.

Herein, the preamble regions 372, 382, 392, the segmented MAP message regions 374, 384, 394 with QPSK ½×2 and the data regions 376, 386, 396 are allocated in each sector frame 370, 380, 390. In this case, the scheduler 200 leaves the regions except the segmented MAP message regions 374, 384, 394 with QPSK ½×2 as empty regions in each sector frame 370, 380, 390. Also, since QPSK ½×2 MCS level is applied to the MAP message regions 374, 384, 394, the data regions 376, 386, 396 are the same size as data regions 316, 326, 336 in case of the common MAP message region 314, 324, 334.

Also, the segmented FAs (e.g., FA1-1, FA1-2, FA1-3) are allocated to the segmented MAP message regions 374, 384, 394 with QPSK ½×2 MCS level in the multiple sectors and thus FRF (Frequency Reuse Factor) for the segmented MAP message regions 374, 384, 394 is 3.

Hereinafter, with reference to FIG. 4, a processing method of the scheduler in a broadband wireless communication system according to an embodiment of the present invention will now be described.

Figure 4:
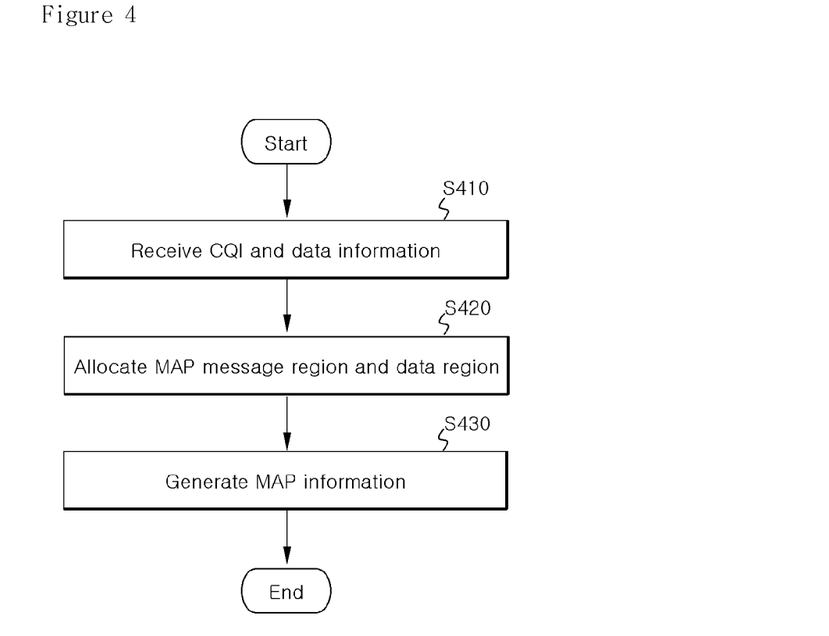
FIG. 4 is a flowchart illustrating a processing method of a scheduler in a broadband wireless communication system according to an embodiment of the present invention.

FIG. 4 is a flowchart illustrating a processing method of a scheduler in a broadband wireless communication system according to an embodiment of the present invention.

Referring to FIG. 4, in Step S410, the scheduler receives the CQI and data information from the MSs in the multiple cells/sectors.

Then, in Step S420, the scheduler checks the data information of the MSs, allocates the MAP message region for the multiple cells/sectors, and allocates the data region for the MSs by using the data information. For reference, detailed descriptions for the MAP message region allocation have been omitted since they have been already accomplished.

Thereafter, in Step S430, the scheduler generates the MAP information in accordance with the data regions allocation. Herein, the MAP information includes data region identification information, position and size information, information about MCS level and transmission power level that are applied to the data region, etc.

Figure 5:
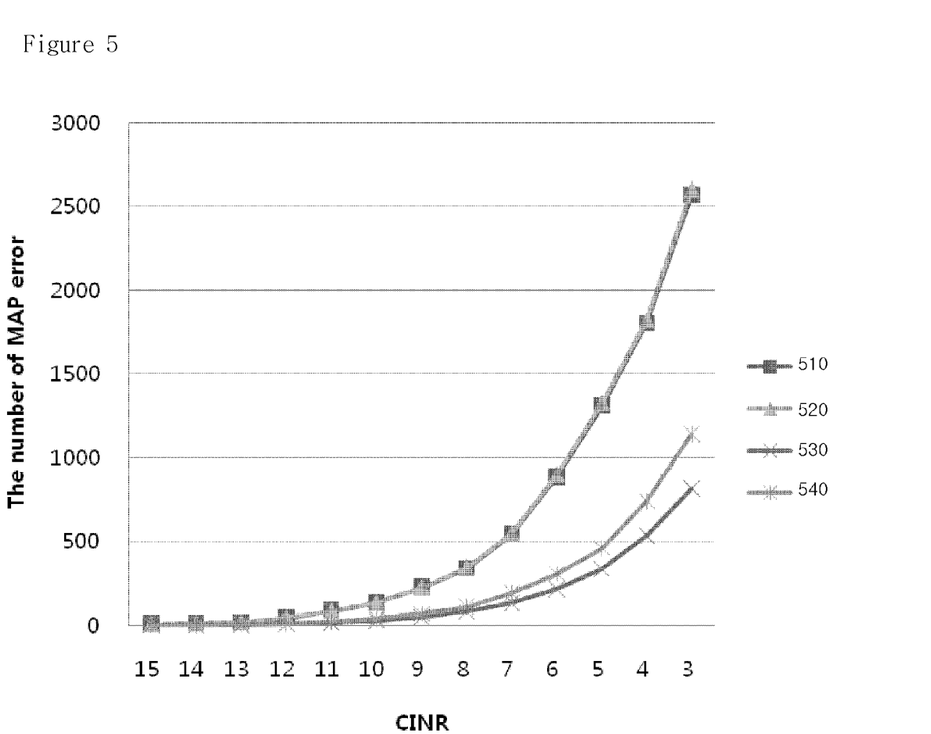
FIG. 5 is a diagram illustrating a MAP message performance comparison in a broadband wireless communication system according to an embodiment of the present invention.

In this way, since the scheduler allocates the MAP message region in the multiple cells/sectors, as illustrated in FIG. 5, the interference in the MAP message owing to the multiple cells/sectors is minimized and thus errors of the MAP message are decreased. For reference, FIG. 5 is a diagram illustrating a MAP message performance comparison in a broadband wireless communication system according to an embodiment of the present invention Referring to FIG. 5, the number of MAP errors 530, 540 of the MAP messages that are transmitted through the MAP message regions 374, 384, 394 with QPSK ½×2 MCS level is lower than the number of the MAP errors 510, 520 of the MAP messages that are transmitted through the common MAP message regions 314, 324, 334 with QPSK ½×6 MCS level. Herein, 510 and 530 denote MAP errors of downlink MAP messages, and 520 and 540 denote MAP errors of uplink MAP messages.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A method for allocating resources in a broadband wireless communication system, the method comprising:
   allocating a common MAP message region and a data region for multiple cells/sectors and segmenting the common MAP message region into sub-MAP message regions for each of the cells or each of the sectors;
   allocating a MAP message corresponding to each of the cells or each of the sectors to each sub-MAP message region, and allocating data to be transmitted to each mobile station to the data region;
   determining Modulation and Coding Scheme (MCS) level and repetition of the MCS level for each of the MAP messages; and
   broadcasting multiple frames including the data region and the each sub-MAP message region for each of the cells or each of the sectors,
   wherein the MCS level for the each sub-MAP message region allows for a lower repetition than if a repetition for the common MAP message region was applied to the common MAP message region as a whole.

2. The method of claim 1, wherein the common MAP message region is a MAP message transmission region allocated to the entire frequency band in the multiple cells/sectors, and the each sub-MAP message region is a MAP message transmission region in which the entire frequency band is divided for each of the cells or each of the sectors.

3. The method of claim 1, wherein divided frequency bands are allocated to the sub-MAP message regions, and wherein the divided frequency bands are corresponding to sub-MAP messages in a Frequency Assignment (FA).

4. The method of claim 1, wherein the repetition of the MCS level for the MAP message is determined as 1 to 3.

5. The method of claim 1, wherein the MAP message for each of the cells or each of the sectors is corresponding to the each sub-MAP message region.

6. The method of claim 1, wherein the common MAP message region is segmented into three sub-MAP message regions and, wherein the first sub-MAP message region is allocated in a first frame, the second sub-MAP message region is allocated in a second frame, the third sub-MAP message region is allocated in a third frame.

7. The method of claim 1, sizes of the sub-MAP message regions are determined by sizes of the MAP messages corresponding to each of the cells or each of the sectors.

* * * * *